(12) United States Patent
Kale et al.

(10) Patent No.: US 11,562,237 B2
(45) Date of Patent: Jan. 24, 2023

(54) PROCESSING OF OVERWHELMING STIMULI IN VEHICLE DATA RECORDERS

(71) Applicant: Micron Technology, Inc., Boise, ID (US)

(72) Inventors: Poorna Kale, Folsom, CA (US); Christopher Joseph Bueb, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 396 days.

(21) Appl. No.: 16/840,233

(22) Filed: Apr. 3, 2020

(65) Prior Publication Data

US 2021/0312273 A1    Oct. 7, 2021

(51) Int. Cl.
| | | |
|---|---|---|
| *G06N 3/08* | (2006.01) | |
| *B60W 60/00* | (2020.01) | |
| *G06F 17/16* | (2006.01) | |
| *G06K 9/62* | (2022.01) | |
| *G06N 3/063* | (2006.01) | |
| *G06N 5/04* | (2006.01) | |
| *G06V 10/764* | (2022.01) | |

(Continued)

(52) U.S. Cl.
CPC ............ *G06N 3/08* (2013.01); *B60W 60/0053* (2020.02); *B60W 60/0059* (2020.02); *G06F 17/16* (2013.01); *G06K 9/6256* (2013.01); *G06N 3/063* (2013.01); *G06N 5/04* (2013.01); *B60W 2555/00* (2020.02)

(58) Field of Classification Search
CPC ............ G06N 3/08; G06N 3/063; G06N 5/04; G06N 3/0454; G06N 3/049; G06N 3/088; G06N 3/04; B60W 60/0053; B60W 60/0059; B60W 2555/00; G06F 17/16; G06K 9/6256; G06V 10/764; G06V 10/774; G06V 10/82; G07C 5/0841
See application file for complete search history.

(56) References Cited

U.S. PATENT DOCUMENTS

| | | |
|---|---|---|
| 10,515,049 B1 | 12/2019 | Fleming et al. |
| 2015/0106314 A1 | 4/2015 | Birdwell et al. |
| 2019/0261171 A1* | 8/2019 | Cozzetti ............ H04W 12/108 |

FOREIGN PATENT DOCUMENTS

| | | | |
|---|---|---|---|
| CA | 3047398 A1 * | 6/2018 | ........... G08G 1/0104 |
| CN | 104869105 | 8/2015 | |

(Continued)

*Primary Examiner* — Asghar H Bilgrami
(74) *Attorney, Agent, or Firm* — Greenberg Traurig

(57) ABSTRACT

Systems, methods and apparatuses of processing overwhelming stimuli in vehicle data recorders. For example, a data recorder can have resources, such as memory components, a controller, an inference engine, etc. The resources can be partitioned into a first subset and a second subset. Abnormal stimuli in an input stream to the recorder may cause delay for real time processing. In response, a time sliced segment of the input stream is selected and assigned to the first subset; and a remaining segment is assigned to the second subset. The first and second subsets can separately process the time sliced segment and the remaining segment in parallel and thus avoid delay in the processing of the remaining segment. An artificial neural network (ANN) can determine a width for selecting the segment processed by the first subset; and the processing result can include a preferred width used to train the ANN.

20 Claims, 10 Drawing Sheets

(51) Int. Cl.
*G06N 3/04* (2006.01)
*G06V 10/774* (2022.01)
*G06V 10/82* (2022.01)

(56) References Cited

FOREIGN PATENT DOCUMENTS

| | | | |
|---|---|---|---|
| CN | 105069695 | 11/2015 | |
| CN | 107423814 | 12/2017 | |
| CN | 108345857 | 7/2018 | |
| CN | 108509850 | 9/2018 | |
| WO | WO-2015173081 A1 * | 11/2015 | ............. G01C 21/32 |

\* cited by examiner

PROCESSING OF OVERWHELMING STIMULI IN VEHICLE DATA RECORDERS

FIELD OF THE TECHNOLOGY

At least some embodiments disclosed herein relate to vehicle data recorders in general and more particularly, but not limited to, processing of overwhelming stimuli in vehicle data recorders.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
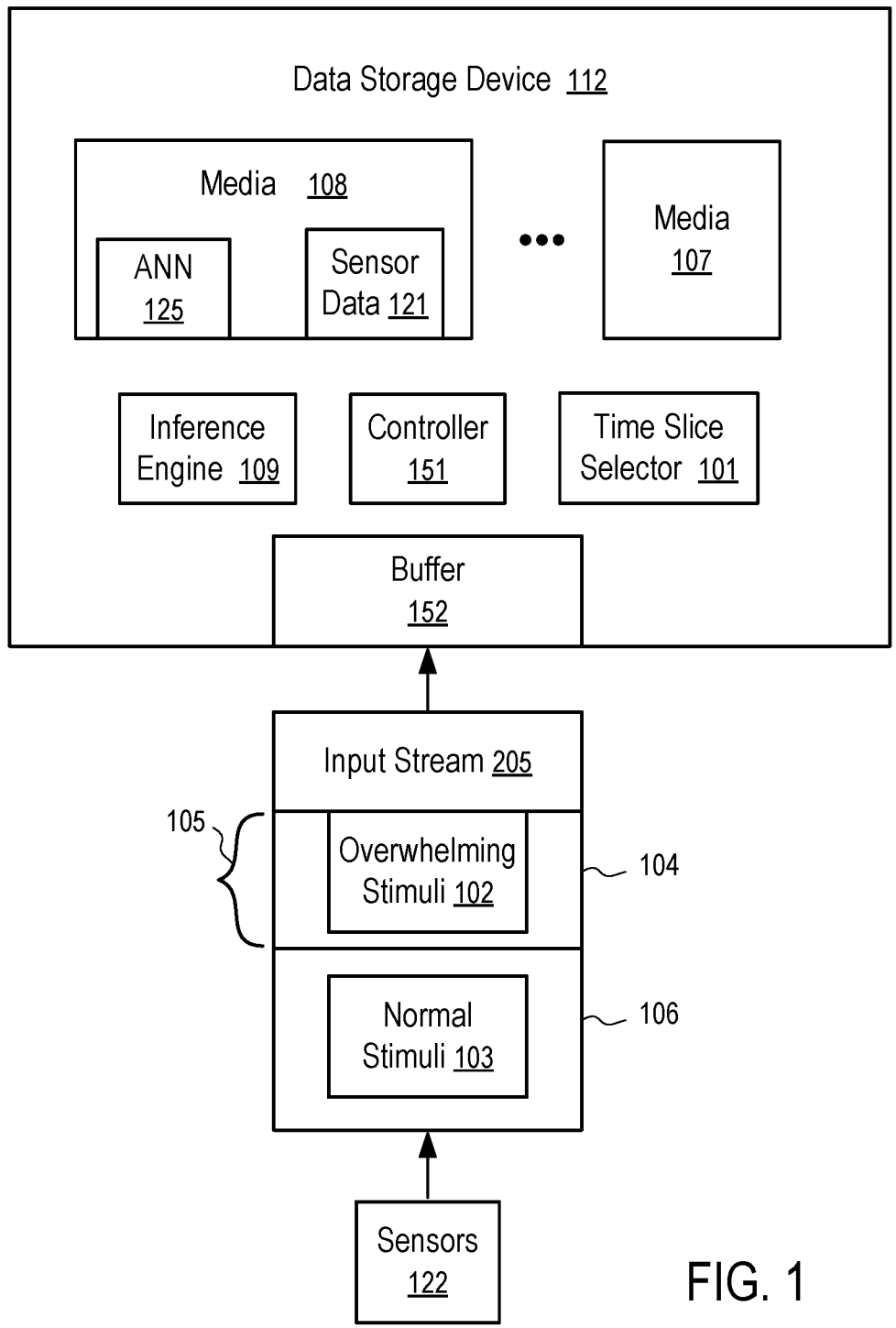
FIG. 1 shows a vehicle data recorder according to one embodiment.

At least some embodiments disclosed herein provide systems, methods and apparatus of protecting resources of a vehicle data recorder from being overwhelmed by malicious stimuli.

Malicious attempts may be made to corrupt the operations of a vehicle black box data recorder by manipulating stimuli applied to the sensors of a vehicle. For example, stimuli may be generated to overwhelm a vehicle data recorder by applying strobe light to a video camera of the vehicle.

In at least some embodiments discussed herein, such malicious attempts can be defeated by using one set of resources to process overwhelming stimuli and using another set of resources to process normal sensor inputs. The resources can include memory, buffer, cache, processing logic, storage capacity, etc., or any combination thereof.

For example, when overwhelming stimuli are detected (e.g., in the form of overflowing the input buffer of the black box data recorder), the data recorder can select and route a time sliced portion of stimuli to a limited set of resources of the data recorder, instead of tasking the entire set of the resources of the data recorder to process the entire incoming stimuli sequentially.

For example, abnormal stimuli can be generated in a short period of time to cause an abnormally large processing burden for the data recorder. When the burden temporarily exceeds the real-time processing capacity of a set of resources, the set of resources can be overwhelmed. The delay caused by the overwhelming stimuli can impact the processing of otherwise normal sensor input that follows the abnormal stimuli, causing substantial delay for the real time processing of the normal sensor input.

For example, one or more individual processor cores can be tasked to process the time-sliced portion that contains the overwhelming stimuli, such that the remaining set of processor cores can be used to handle other portions of stimuli that would be normal.

However, instead of configuring all of the processor cores of a vehicle data recorder as an aggregated unit to process the input data together as a single data stream, a time sliced portion of stimuli can be selected for processing by a limited subset that contains one or more individual processor cores. While the one or more individual processor cores may be overwhelmed by the malicious stimuli, the remaining subset of the processor cores of the vehicle data recorder can continue to process in real time the remaining and incoming stimuli that can be substantially normal. Thus, the delay and/or impact of the malicious stimuli can be substantially isolated to the limited subset of one or more individual processor cores tasked to handle the overwhelming stimuli.

A default width of the time sliced portion of stimuli selected for the isolation of overwhelming stimuli can be initially set in accordance with best known usage examples. A time sliced portion of stimuli can be referred to as a time sliced stimuli. The width for the selection of a time sliced stimuli for isolation can be subsequently optimized through machine learning. For example, an artificial neural network (ANN) can be trained to predict an optimized width for the selection of a time sliced stimuli. The slice is optimized to substantially contain the malicious/overwhelming segment of stimuli without being overly inclusive. The processing of the selected slice can be delayed due to overwhelming stimuli. However, since the selected slice is being removed from the task for processing by the remaining resources, the remaining and incoming stimuli can be processed in real time.

After a time sliced stimuli is processed by a subset of one or more processor cores that are tasked to handle malicious stimuli, the subset of one or more processor cores can identify a portion of the time sliced stimuli that follows the malicious stimuli and that is determined to be normal. Thus, a preferred adjustment to the width of the time sliced stimuli for selection can be measured to exclude the portion of the time sliced stimuli that is determined to be normal. A portion of training dataset can be generated to associate, the operating parameters relevant to the instance of the malicious attempt, with the adjustment to reduce the width and optimize the selection width.

Similarly, in some instances, a residual portion of the malicious stimuli is found to be in the remaining slice of stimuli after the time sliced stimuli has been isolated. In such instances, the initial width used for the selection of the time sliced stimuli is too small. Thus, a preferred adjustment to the width of the time sliced stimuli can be measured to include the residual portion of the malicious stimuli that was initially left to remain in the input stream for processing by the remaining resources of the data storage device. A portion of training dataset can be generated to associate, the operating parameters relevant to the instance of the malicious attempt, with the adjustment to increase the width.

The training dataset can be used to train the artificial neural network (ANN) in predicting, based on operating parameters, an optimal adjustment for the current operating parameters relevant to the current instance of the malicious attempt and thus the optimized width of time sliced stimuli for isolation for the current attack.

Further, for example, when a vehicle data recorder has multiple storage units that can be operated independent from each other, a subset of the storage units can be used for handling overwhelming stimuli, while the remaining subset can be used for handling normal stimuli. For example, if one of the storage units is overwhelmed, operations can be performed by the other storage units in a sufficient speed to process remaining stimuli and provide useful results in real time.

FIG. 1 shows a vehicle data recorder according to one embodiment.

The vehicle data recorder of FIG. 1 can include a data storage device (112) that has a set of resources, such as a buffer (152), a controller (151), an inference engine (109), and storage media (e.g., 107 and 108).

The controller (151) can optionally include multiple processor cores that can operate independent from each other. The storage device (112) can optionally include multiple units (e.g., 107 and 108) of media that can be operated upon independently from each other and in parallel by the controller (151). Similarly, the inference engine (109) can optionally include multiple logic units or processor cores to accelerate computations involving an artificial neural network (ANN) (e.g., 125).

The vehicle data recorder of FIG. 1 is configured to receive an input stream (205) from sensors (122) configured on a vehicle. The input stream (205) may contain a segment (104) of overwhelming stimuli (102) that can cause significant delay in the operation of the data storage device (112) such that if the data storage device (112) were to be required to complete the processing of the segment (104) before processing the remaining portion (106) of the input stream (205), the delay in the processing of the remaining portion (106) of the input stream (205) can exceed a threshold.

In response to the detection of an abnormally large processing load associated with the overwhelming stimuli (102), a time slice selector (101) is configured to select a segment (104) of the input stream (205) according to a time width (105). Abnormally large processing load can be identified based on comparing the current processing load with an average of processing load in a period of time. When the current processing load is more than a threshold multiple of the average, the current processing load can be identified as abnormally large. Sensor data generated within the time width is taken out of the buffer (152) for offloading to a subset of the resources of the data storage device (112). Thus, the remaining portion (106) of the input stream (205) can be processed by the remaining resources of the data storage device (112) without excessive delay.

For example, some of the processing cores of the controller (151) can be used to process the selected segment (104) using the media (107), while the remaining processing cores of the controller (151) can use the media (108) to process the segment (106) that follows the selected segment (104) in the input stream (205).

Optionally, a portion of the processing units of the inference engine (109) is allocated to process the selected segment (104) that contains overwhelming stimuli (102), while the remaining portion of the processing units of the inference engine (109) is used to process the remaining segment (106) that has the normal stimuli (103). As a result, even though the processing of the selected segment (104) is delayed, the processing of the remaining segment (106) containing the normal stimuli (103) can be performed in time to provide useful results.

In at least some embodiments, the data storage device (112) includes an artificial neuron network (ANN) (e.g., 125) configured to predict an optimized width (105) for the selection of the segment (104). The ANN (e.g., 125) can be further trained after the processing of the input stream (205). For example, after processing the input stream (205) containing the overwhelming stimuli (102) and a portion of the normal stimuli (103) that follows the overwhelming stimuli (102), the data storage device (112) can measure the width of the overwhelming stimuli (102). The artificial neuron network (e.g., 125) can be further train to minimize the difference between a predicted width for the circumstance of the input stream (205) associated with the overwhelming stimuli (102) and the measured width of the overwhelming stimuli (102).

In general, the training of the artificial neuron network (e.g., 125) does not have to be limited to the data derived from processing input stream (205) provided to the data storage device (112). Training data collected from similar vehicle data recorders configured in similar vehicles can be combined to train an artificial neuron network for the vehicle data recorders and then used to update the artificial neuron network (e.g., 125) in the data storage device (112). Further, the training can be performed in a centralized server that receives data from the vehicle data recorders, or the vehicles having the data recorders. Optionally, the artificial neuron network (e.g., 125) can be trained using data derived from processing input stream (205) provided to the data storage device (112) to customize for the vehicle in which the data storage device (112) is used.

Figure 2:
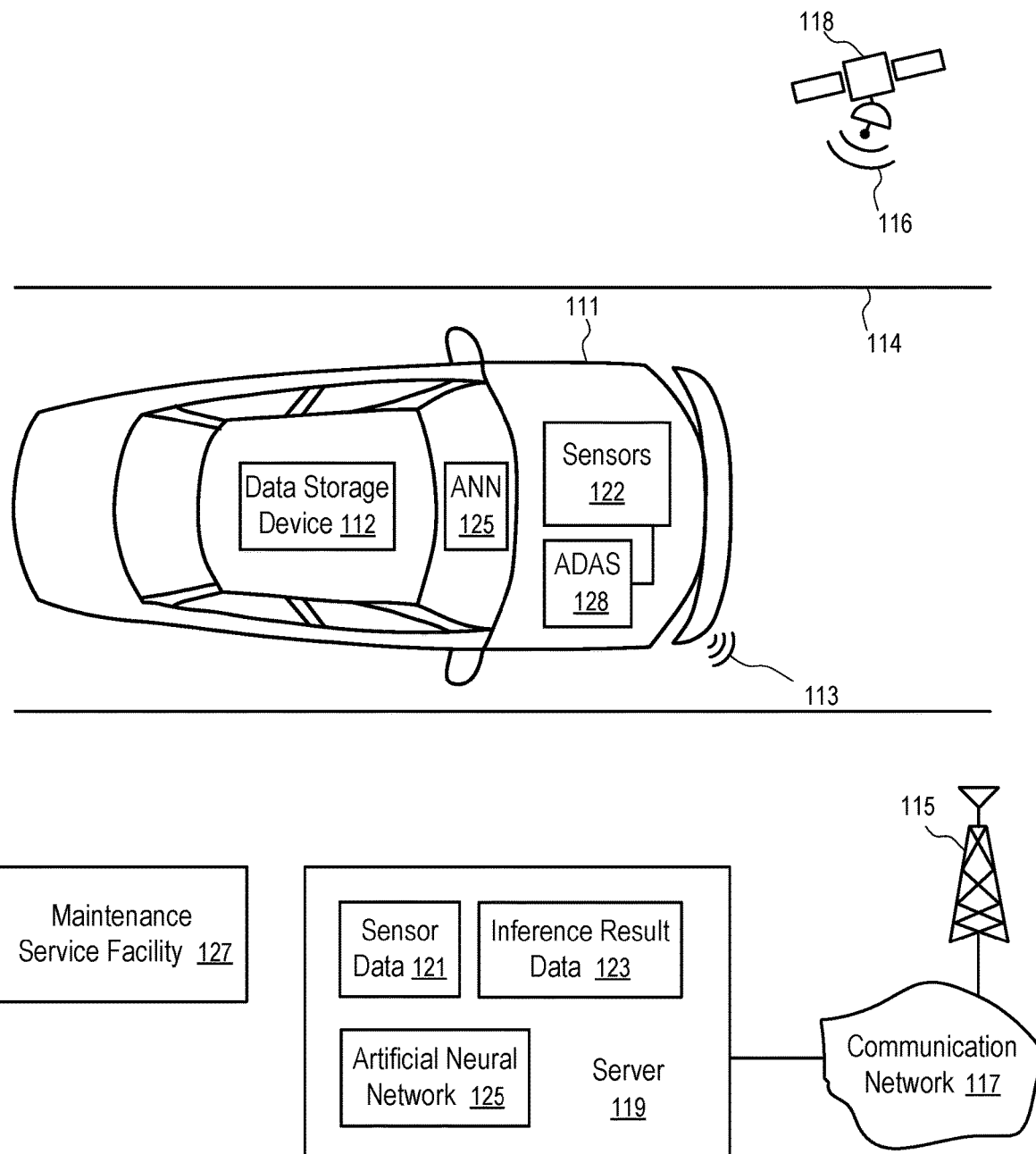
FIG. 2 shows a system having a vehicle configured to collect and process sensor data according to some embodiments.

The data storage device (112) can be configured, for example, in a vehicle illustrated in FIG. 2.

FIG. 2 shows a system having a vehicle (111) configured to collect and process sensor data according to some embodiments.

The vehicle (111) in FIG. 2 has a data storage device (112), sensors (122), an ANN (125), and an ADAS (128) configured to process sensor data, including inputs from the sensors (122), to generate control signals for the vehicle (111).

For example, the sensors (122) in FIG. 2 can include sensors (122) illustrated in FIG. 1; and the data storage device (112) of FIG. 1 can be used to implement the data storage device (112) of the vehicle (111) of FIG. 2.

In general, one or more sensors (e.g., 122) can be configured on the vehicle (111) to generate sensor data input to the ADAS (128) and/or the data storage device (112). The data storage device (112) and/or the ADAS (128) can be configured to use the ANN (125) to generate inference results. The inference results can include a control signal for operating or driving the vehicle (111), a suggestion for a maintenance service of the vehicle (111), etc.

In some implementations, at least a portion of the data generate by the sensors (e.g., 122) is used in both the ADAS (128) for driver assistance and in the ANN (125) for maintenance prediction. Optionally, the output of the ANN (124) can be used in both the data storage device (112) and in the ADAS (128). The ANN (125) can be part of the ADAS (128).

Some of the sensors (122) can be configured in a digital camera, lidar, radar, ultrasound sonar, etc. Other types of sensors can also be used, such as brake sensors, speed sensors, acceleration sensors, airbag sensors, a GPS (global positioning system) receiver, audio sensors/microphones, vibration sensors, force/stress sensors, deformation sensors, motion sensors, temperature sensors, etc. Some of the sensors (122) can be configured primarily to monitor the environment of the vehicle (111); and other sensors (122) can be configured primarily to monitor the operating condition of one or more component of the vehicle (111), such as an internal combustion engine, an exhaust system, an electric motor, a brake, a tire, a battery, etc.

The ANN (125) of the vehicle (111) is configured to process the sensor input data from the sensors (122) to control the vehicle (111) and/or the data storage device (112), and/or generate alerts for maintenance services.

In general, the outputs of the sensor(s) (122) as a function of time are provided as a sensor data stream to the ADAS (128) and/or the ANN (125) to provide driver assistance (e.g., autonomous driving) and maintenance prediction.

At least a portion of the sensor data stream can be provided to the data storage device (112) for storing and/or for processing. For example, a portion of the ANN (125) can be implemented in the data storage device (112). The inference engine (109) of the data storage device (112) can process the sensor data stream to generate inference results for further processing by the ADAS (128). Thus, the input data stream to the data storage device (112) can include at least a portion of the sensor data stream from the sensors (122); and the output data stream can include inference results generated using the ANN (125) in the data storage device (112) for the ADAS (128) of the vehicle (111). The operating condition of the vehicle (111) and thus the workload of the data storage device (112) can be determined from the patterns in the input/output data streams of the data storage device (112).

The ANN (125) of the vehicle (111) and/or in the data storage device (112) can include an SNN configured to classify time-based variations of sensor data and/or detect deviation from known patterns of sensor data of the vehicle (111). When the ANN (125) detects the deviation from known patterns, the sensor data corresponding to the deviation can be stored in the data storage device (112) for further analysis and/or for further training of the ANN (125).

The data storage device (112) of the vehicle (111) can be configured to record sensor data for a period of time. The recorded sensor data can be used in the ANN (125) and/or used to further train the ANN (125). For example, the ANN (125) of FIG. 2 can be the same, or include, the ANN (125) of FIG. 1. The maintenance service facility (e.g., 127) can download the sensor data (121) from the data storage device (112) and provide the sensor data (121) and the corresponding inference result data (123) to the server (119) to facilitate the training of the ANN (125).

Optionally, or in combination, the data storage device (112) is configured with a machine learning module to customize and/or train the ANN (125) installed in the vehicle (111) and/or in the data storage device (112).

The vehicle (111) can have a wireless communication device to communicate with a remote server (119) via wireless signals (113) and a communication network (117). The remote server (119) is typically configured at a location away from a road (114) on which the vehicle (111) is in service. For example, the vehicle (111) may provide some sensor data (121) to the server (119) and receive update of the ANN (125) from the server (119).

The communication network (117) can be a cellular phone network having one or more base stations (e.g., 115) to receive the wireless signals (e.g., 113). Alternatively, or in combination, the communication network (117) can include the Internet, where the wireless local area network signals (e.g., 113) transmitted by the vehicle (111) is received in an access point (e.g., 115) for further communication to the server (119). In some implementations, the vehicle (111) uses a communication link (116) to a satellite (118) or a communication balloon to communicate with the server (119).

The server (119) can also communicate with one or more maintenance service facilities (e.g., 127) to receive the sensor data (121) and/or the desired inference result data (123) of vehicles (e.g., 111).

For example, the desired inference result data (123) can be generated by a human operator inspecting the sensor data (121) (e.g., images from the sensors (122)) and/or relevant conditions of the vehicle (111). For example, the desired inference result data (123) can include inspection records and/or service records of components of the vehicles (e.g., 111). For example, the inspection records and/or service records can indicate the degree of wear and tear of components inspected during their services at the maintenance service facilities (e.g., 127), the identification of failed or malfunctioning components, etc. The sensor data (121) of the vehicles (e.g., 111) obtained in a time period relevant to the desired inference result data (123) can be used to train an ANN (125) at the server (119) to improve inference capability of the ANN (125).

The updated ANN (125) can be installed in the vehicle (111) at the maintenance service facility (127). Alternatively, the update ANN (125) can be transmitted to the vehicle (111) to update the vehicle (111) over the air.

A portion of the ANN (125) responsible for the processing of input from the sensors (122) can be configured in the data storage device (112). The inference engine (109) of the data storage device (112) processes the inputs from the sensors (122) to generate the inference results transmitted from the data storage device (112) to the ADAS (128). Based on the input from the sensors (122) and/or the inference results to the ADAS (128), the inference engine (109) data storage device (112) can generate inference results to optimize the performance of the data storage device (112) in processing the input data stream and the output data stream, by adjusting the operations of buffering/caching, garbage collection, wear leveling, etc.

Figure 3:
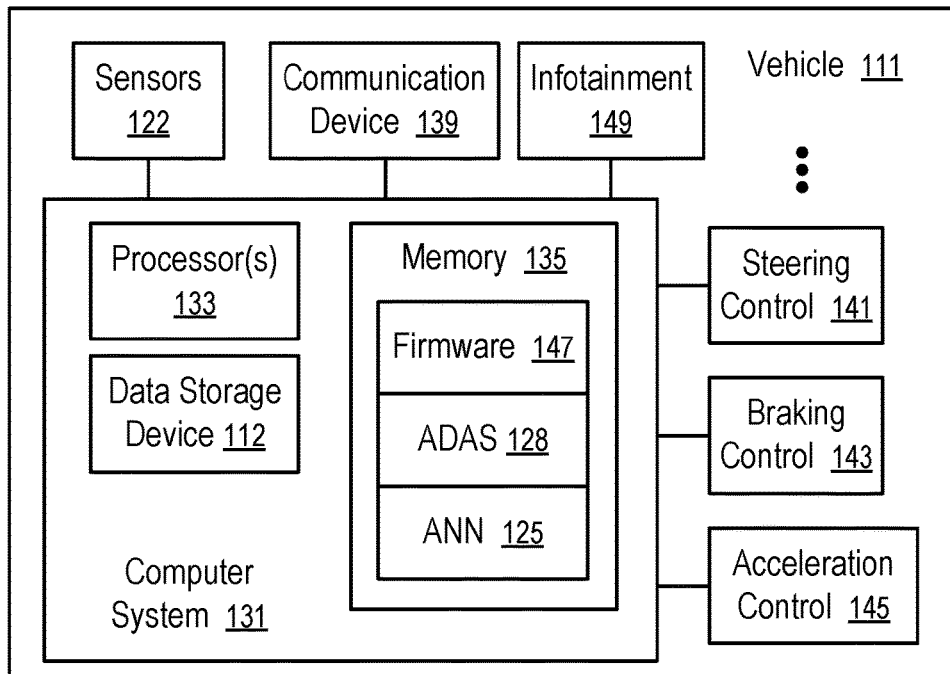
FIG. 3 shows an autonomous vehicle according to one embodiment.

FIG. 3 shows an autonomous vehicle (111) according to one embodiment. For example, the vehicle (111) in the system of FIG. 2 can be implemented using the autonomous vehicle (111) of FIG. 3.

In general, the vehicle (111) can include an infotainment system (149), a communication device (139), one or more sensors (122), and a computer system (131) that is connected to some controls of the vehicle (111), such as a steering control (141) for the direction of the vehicle (111), a braking control (143) for stopping of the vehicle (111), an acceleration control (145) for the speed of the vehicle (111), etc. In some embodiments, the vehicle (111) in the system of FIG. 2 has a similar configuration and/or similar components.

The vehicle (111) of FIG. 3 is configured with an Advanced Driver Assistance System (ADAS) (128). The ADAS (128) of the vehicle (111) can have an Artificial Neural Network (ANN) (125) for object detection, recognition, identification, and/or classification, based on images generated in the sensors (122). A portion of the ANN (125) can be implemented in the data storage device (112) of FIG. 1.

The computer system (131) of the vehicle (111) can include one or more processors (133), a data storage device (112), and memory (135) storing firmware (or software) (147), including the computer instructions and data models for ADAS (128).

Sensors (122) of the vehicle (111) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors (122) of the vehicle (111) can include audio sensors (e.g., microphone) configured to monitor noises from various components and locations in the vehicle (111), a vibration sensor, a pressure sensor, a force sensor, a stress sensor, and/or a deformation sensor configured to measure loads on a component of the vehicle (111), accelerometers and/or gyroscope sensors measuring the motions of some components of the vehicle (111), etc. Such sensors can be used to monitor the operating status and/or health of the components for predictive maintenance.

The sensors (122) can provide a stream of real time sensor data to the computer system (131). The sensor data generated by sensors (122) of the vehicle (111) can include an image that captures an object using a camera that images using lights visible to human eyes, or a camera that images using infrared lights, or a sonar, radar, or LIDAR system. Preferably, the image is processed by the inference engine (109) of the data storage device (112) to generate inference results as the output data stream of the data storage device (112) and thus reduce the computation workload of the main computer system (131).

For example, a camera can be used to obtain roadway information for the travel of the vehicle (111), which can be processed by the ANN (125) to generate control signals for the vehicle (111). For example, a camera can be used to monitor the operation state/health of a component of the vehicle (111), which can be processed by the ANN (125) to predict or schedule a maintenance service.

The infotainment system (149) of the vehicle (111) can be used to present data and/or inference results from the sensors (122). For example, compressed images with reduced resolution and refreshing frequency can be generated in the sensors (122) and transmitted to the infotainment system (149) for presentation to an occupant of the vehicle (111). Optionally, the communication device (139) can establish a connection to a mobile device of an occupant of the vehicle (111) to make the presentation.

When the vehicle (111) is configured with an ADAS (128), the outputs of the ADAS (128) can be used to control (e.g., 141, 143, 145) the acceleration of the vehicle (111), the speed of the vehicle (111), and/or the direction of the vehicle (111), during autonomous driving.

Figure 4:
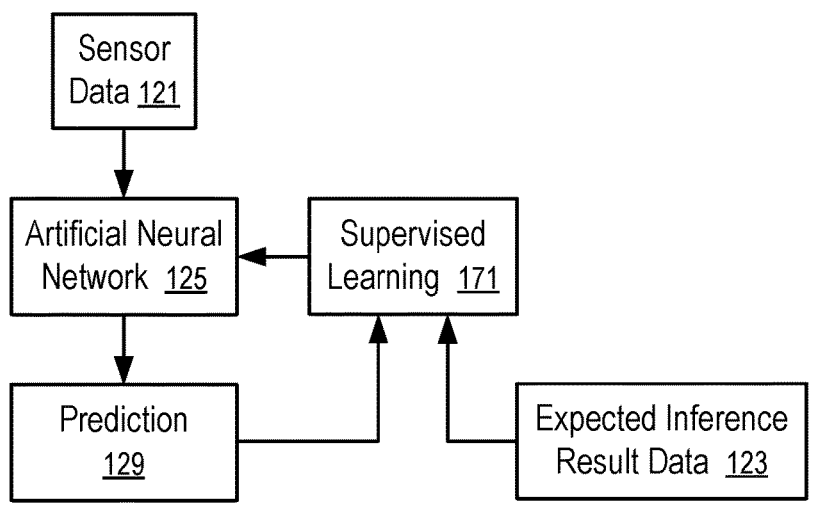
FIGS. 4-6 illustrate training of artificial neural networks for prediction according to some embodiments.
Figure 5:
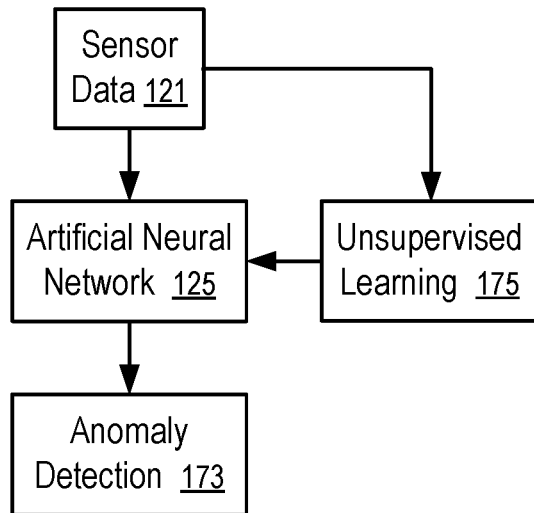
Figure 6:
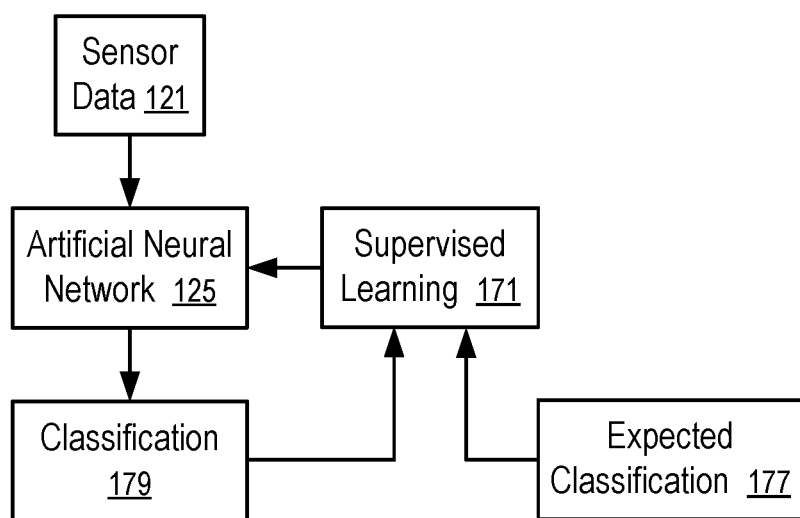

FIGS. 4-6 illustrate training of artificial neural networks (125) for prediction according to some embodiments.

In FIG. 4, a module (171) of supervised machine learning is used to train an artificial neural network (125) to minimize the differences between the prediction (129) generated from the sensor data (121) and the desired inference result data (123).

For example, the sensor data (121) can include an image showing an object; and the desired/expected inference result data (123) can identify an image region occupied by the object, a feature of the object, a classification of the object, an identity of the object, etc.

For example, the sensor data (121) can include an image surrounding of the vehicle (111); and the desired/expected inference result data (123) can include preferred control inputs for the steering control (141), the braking control (143), and the acceleration control (145).

The desired/expected inference result data (123) can be generated by a human operator. For example, the sensor data (121) can be used to construct a virtual reality demonstration of a situation encountered by the vehicle (111), including images from the sensors (122) showing an environment of the vehicle (111); and the desired/expected inference result data (123) can include responses generated by a human operator responsive to the virtual reality demonstration of the situation.

The supervised machine learning module (171) can adjust the artificial neural network (125) to reduce/minimize the difference between the prediction (129) generated based on the sensor data (121) and the desired/expected inference result data (123) generated by a human operator.

The supervised learning (171) of FIG. 4 can be applied in the server (119) based on the sensor data of a population of vehicles and corresponding desired/expected inference result data (123) to generate a generic ANN for the population of the vehicles.

The supervised learning (171) of FIG. 4 can be applied in the vehicle (111) based on the sensor data of the vehicle and inference result data (123) to generate a customized/personalized ANN (125). For example, a generic ANN (125) can be initially used in the vehicle (111); and the sensor data of the vehicle (111) and desired/expected inference result data (123) specific to the vehicle (111) can be used to further train the ANN (125) of the vehicle for customization/personalization of the ANN (125) in the vehicle (111).

In FIG. 5, a module (175) of unsupervised machine learning is used to train or refine an artificial neural network (125) to facilitate anomaly detection (173). The unsupervised machine learning module (175) is configured to adjust the ANN (e.g., SNN) to generate the normal classification, clustering, or recognized patterns in the sensor data (121) such that a degree of deviation from the normal classification, clustering, or recognized patterns in the sensor data (121) can be used to signal the detection (173) of anomaly.

For example, anomaly detection (173) can be used to preserve the sensor data (121) associated with anomaly for further analysis. In response to anomaly detection (173) in the vehicle (111), the computer system (131) can issue read command to the sensors (122) to retrieve image data associated with the anomaly from the sensors (122) and store the retrieved image data in the data storage device (112). The image data associated with the anomaly can be temporarily preserved in the memory device of the sensors (122) and loaded to the data storage device (112) over a period of time using available communication bandwidth between the sensors (122) and the data storage device (112) without impacting the normal operations of the ADAS (128).

When the vehicle (111) is in the maintenance service facility (127), the image data (and other sensor data) associated with the anomaly can be retrieved from the data storage device (112) to generate desired/expected inference result data (123) for further training of the ANN (125) using a supervised learning (171) of FIG. 4.

Optionally, a supervised machine learning (171) can be used to train the ANN (125), as illustrated in FIG. 6. The supervised learning (171) can be used to minimize the classification differences between the predictions (179) made using the ANN (125) according to the sensor data (121) and the expected classification (177).

For example, in absence of an accident, a near accident event, or a user input indicating an abnormal condition, a classification of "normal" can be assumed. An accident, a near accident event, or a user input can be used to identify an expected classification of "abnormal" for the sensor data leading to the accident, event, or user input. The supervised machine learning (171) can be used to train the artificial neural network (125) to make the classification (179) with reduced/minimized differences from the expected classification (177).

Optionally, the inference engine (109) of the data storage device (112) can be configured to accelerate the computations of a portion of the artificial neural network (ANN) (125) implemented in the data storage device (112).

For example, the inference engine (109) can include a neural network accelerator (159) (e.g., illustrated in FIG. 7) specialized to perform at least part of the computations involving the artificial neural network (ANN) (125), such as dot-product of vectors and tensors, multiply and accumulation operations, etc.

Figure 7:
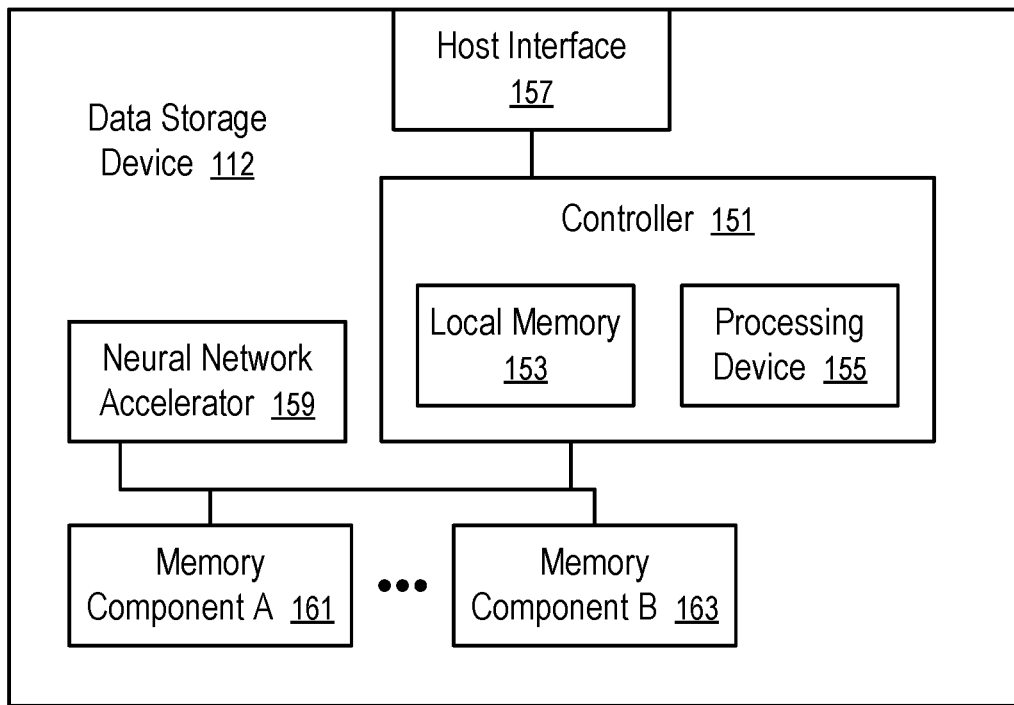
FIG. 7 shows a data storage device with a neural network accelerator according to one embodiment.

FIG. 7 shows a data storage device (112) with a neural network accelerator (159) according to one embodiment. For example, the data storage device (112) of FIG. 7 can be used in the vehicle (111) illustrated in FIG. 2 or 3.

In FIG. 7, the data storage device (112) has a host interface (157) configured to communicate with a host processor (e.g., 133 in FIG. 3). For example, the communication between the host processor (e.g., 133) and the host interface (157) can be, at least in part, in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

For example, the host computer system (131) can communicate with the host interface (157) to retrieve inference results generated by the data storage device (112) from the input data stream that contains sensor data generated by the sensors (122) of the vehicle (111).

For example, the host interface (157) can be used to receive, from the sensors (122), sensor data (121) of the vehicle (111); and the sensor data (121) can be optionally stored in the data storage device (112) for an analysis of a subsequent accident or near accident event.

In FIG. 7, each of the memory components (161 to 163) can be a memory integrated circuit configured to store data.

The neural network accelerator (159) and the controller (151) can be implemented via logic circuits formed on one or more integrated circuit dies that are stacked on the integrated circuit dies of the memory components (161 to 163). Through-silicon vias between the integrated circuit die(s) of the neural network accelerator (159) and the controller (151) and the integrated circuit dies of the memory components (161 to 163) can be used to provide high communication bandwidth for processing the data stored in the memory components (161 to 163) to generate inference results. The inference results can be stored in the local memory (153) of the controller (151) and/or some of the memory components (161 to 163) for retrieval by the host system, such as the computer system (131) of the vehicle (111). For example, different memory components (161 to 163), or different sections of a memory component (e.g., 161 or 163), can use through-silicon vias to facilitate parallel access for different portions of the neural network accelerator (159), and the controller (151).

In general, some memory integrated circuits are volatile and require power to maintain the stored data; and some memory integrated circuits are non-volatile and can retain the stored data even when not powered. The memory components (161 to 163) can include volatile memory and/or non-volatile memory. The memory components (161 to 163) can implement different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer is located above the memory element columns, and wires of the other layer is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The data storage device (112) can have a controller (151) that includes volatile local memory (153) and at least one processing device (155).

The local memory of the controller (151) can be an embedded memory configured to store instructions for performing various processes, operations, logic flows, and routines that control operation of the processing device (155), including handling communications between the data storage device (112) and the processor(s) (e.g., 133) of the vehicle (111), and other functions described herein. Optionally, the local memory (153) of the controller (151) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 7, the data storage device (112) includes a neural network accelerator (159) coupled to the controller (151) and/or the memory components (161 to 163).

For example, the neural network accelerator (159) can be configured to perform matrix arithmetic computations more efficiently than the processing device (155) of the controller (151). The computations involving ANN (125) have matrix multiplication and accumulation operations, which can be computational intensive for a generic processor (e.g., 133, 155). Using the neural network accelerator (159) to perform the matrix arithmetic computations can reduce the data to be transmitted to the processor(s) (133) of the vehicle (111) and reduce the computation workload for the processor(s) (133, 155).

When the ANN (125) includes a Spiking Neural Network (SNN), the simulation of the differential equation(s) for controlling the activation level of SNN neurons can be computationally intensive for a generic processor (e.g., 133, 155). Optionally, the neural network accelerator (159) can use special hardware to simulate the differential equation(s) and thus improve the computational efficiency in implementing the SNN.

In some implementations, the neural network accelerator (159) is an integrated circuit device separate from the controller (151) and/or the memory components (161 to 163). Alternatively, or in combination, a neural network accelerator (159) is integrated with the controller (151) in an integrated circuit die. Alternatively, or in combination, a portion of the neural network accelerator (159) can be integrated on the integrated circuit die(s) of at least one of the memory components (161 to 163), as illustrated in FIG. 8.

Figure 8:
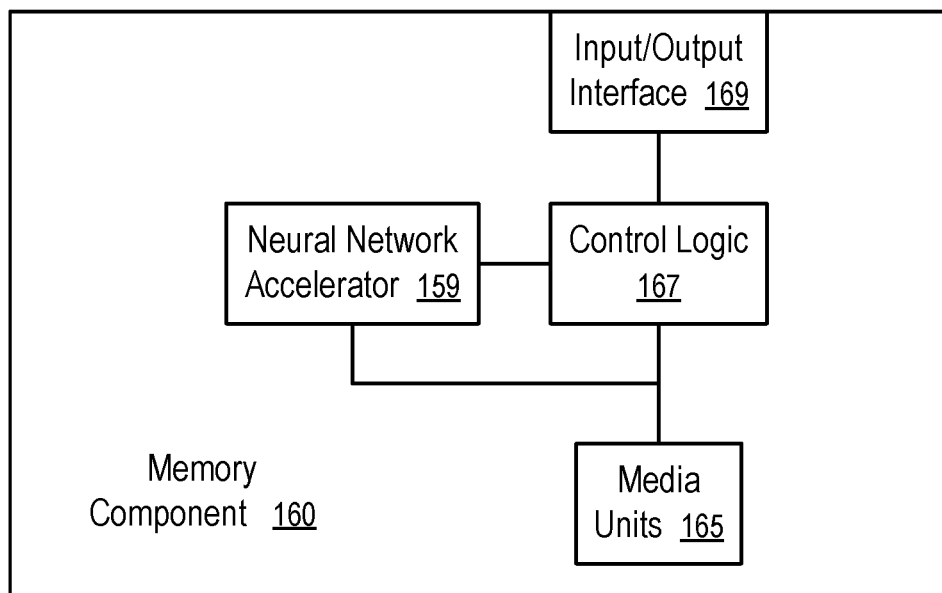
FIG. 8 shows a memory component to accelerate neural network computations according to one embodiment.

FIG. 8 shows a memory component (160) to accelerate neural network computations according to one embodiment. For example, each or some of the memory components (161 to 163) in FIG. 7 can be implemented using a memory component (160) of FIG. 8.

In FIG. 8, the memory component (160) can be formed on an integrated circuit die. An input/output (I/O) interface (169) of the memory component (160) is configured to process input/output signals for the memory component (160). For example, the input/output signals can include address signals to specify locations in the media units (165) and data signals representing data to be written in the media units (165) at the locations specified via the address signals, or data retrieved from the locations in the media units (165).

In FIG. 8, a neural network accelerator (159) is coupled with the control logic (167) and/or the media units (165) to perform computations that are used in the evaluation of the output of a portion of an ANN (125) and/or in the training of the ANN (125).

For example, the input/output interface (169) can receive addresses that identify matrices that are stored in the media units and that are to be operated upon via the neural network accelerator (159). The memory component (160) can provide the computation results of the neural network accelerator (159) as the output data responsive to the addresses, store the output data in a buffer for further operations, store the output data into a location in the media units (165) specified via the address signals. Thus, the computations performed by the neural network accelerator (159) can be within the memory component (160), which is close to the media units (165) in which the matrix data is stored.

For example, the state data of SNN neurons can be stored in the media units (165) according to a predetermined pattern. The neural network accelerator (159) can automatically update the states of the SNN neurons according to the differential equation(s) for controlling the activation level of SNN neurons over time. Optionally, the neural network accelerator (159) is configured to process spiking of neurons in the neural network. Alternatively, the neural network accelerator (159) of the data storage device (112) and/or the processor(s) (133) can be configured to process the spiking of neurons and/or accumulation of inputs to the SNN.

For example, the sensors (122) generate sensor data (e.g., images) at a predetermined frequency. Each image is stored into the memory components (161 to 163) in a cyclic way where the newest image writes over the oldest image. The memory components (161 to 163) further store a portion of ANN (125) of the vehicle (111) responsible for processing of the images from the sensors (122). The controller (151) processes the images in the memory components (161 to 163) according to the portion of ANN (125) to generate inference results. The inference results are stored in the memory components (161 to 163) and/or in the local memory (153) of the controller (151) for reading by the host system, such as the computer system (131) of the vehicle (111).

For example, the data storage device (112) receives a sensor data stream from at least one sensor (122) configured on the vehicle (111) and generate the inference results based on the sensor data stream according to the portion of ANN (125) stored in the memory components (161 to 163). A neural network accelerator (159) configured within the data storage device (112) performs at least a portion of computations based on an artificial neural network (125) and the sensor data stream.

Optionally, the neural network accelerator (159) can be configured on an integrated circuit die that is separate from a controller (151) and/or separate from the memory components (161 to 163).

Optionally, the neural network accelerator (159) can be configured on an integrated circuit die that includes a controller (151) of the data storage device (112), or memory component (160, 161 or 163) of the data storage device (112).

The neural network accelerator (159) can be configured to perform computations, such as matrix arithmetic computations for ANN and/or differential equation simulations for SNN, using data stored in the data storage device (112).

Examples of the matrix arithmetic computations include matrix multiplication and accumulation operations. After a computation to generate a result of the matrix arithmetic computations using a data stored in the data storage device (112), the neural network accelerator (159) can provide the result as output of the data storage device (112) in data retrieval operations (e.g., in response to a read command). Alternatively, or in combination, the result of the matrix arithmetic computation can be buffered in the data storage device (112) as operand for a next matrix computation performed in combination with a matrix of data retrieved from the non-volatile memory via a read command received in the host interface (157).

When the Artificial Neural Network (ANN) (125) includes a Spiking Neural Network (SNN), the neural network accelerator (159) can be configured to simulate a differential equation controlling activation levels of neurons in the Spiking Neural Network (SNN). Optionally, the memory component (160) is configured to store states of the neurons in the spiking neural network according to a predetermined pattern; and the neural network accelerator is configured to automatically update the states of the neurons over time according to the differential equation. For example, the neural network accelerator (159) can be configured to train the Spiking Neural Network (SNN) via unsupervised machine learning to detect anomaly.

The computations performed by the neural network accelerator (159) according to an Artificial Neural Network (ANN) (125) involve different types of data that have different patterns of usages of the data storage device (112).

For example, making a prediction using the Artificial Neural Network (ANN) (125) includes the use of data specifying the model of the Artificial Neural Network (ANN) (125), input data provided to the artificial neurons, and output data generated by the artificial neurons.

The memory capacity of the data storage device (112) can be partitioned into different portions for the different types of ANN-related data. The different portions can be separately configured to optimize the access and storage of the corresponding data according to their patterns of usages by the neural network accelerator (159) and/or the processor(s) (133) of the computer system (131) in which the data storage device (112) is configured.

The model of the Artificial Neural Network (ANN) (125) can include the parameters specifying the static attributes of individual artificial neurons in the ANN (125) and the neuron connectivity in the ANN (125). The model data of the ANN (125) is static and does not change during the prediction calculation made using the ANN (125). Thus, the usage pattern of the model data is mostly read. However, the model data of the ANN (125) can change when an updated ANN (125) is installed. For example, the vehicle (111) can download an updated ANN (125) from the server (119) to the data storage device (112) of the vehicle (111) to update its prediction capability. The model data of the ANN (125) can also change during or after the training of the ANN (125) using a machine learning technique (e.g., 171 or 175). It is preferred to configure a separate memory partition or region of the data storage device (112) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (125) can include external inputs and internal inputs. The external inputs are generated typically by the sensors (e.g., 122) of the vehicle (111) but not by artificial neurons in the ANN (125). The external inputs can be saved in a cyclic fashion so that the input data of the most recent time period of a predetermined length of driving can be found in the data storage device (112). Thus, it is preferred to configure a separate memory partition or region of the data storage device (112) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (125) can be buffered for further access by the neural network accelerator (159) and/or the processor(s) (133) of the computer system (131). The output data can include external outputs and internal outputs. The external inputs are generated by artificial neurons as the output from the ANN (125), such as the results of classifications or predictions made by the ANN (125). The output of the ANN (125) is typically further processed by the processor(s) (133) of the computer system (131). The external inputs may be saved periodically (e.g., in a way similar to the storing of the state variable data). The internal outputs and/or some of the external outputs can be internal inputs to artificial neurons in the ANN (125). In general, it may not be necessary to store the internal outputs from the buffer of the data storage device to the memory components. In some implementations, when the buffer capability of the data storage device (112) is insufficient to hold the entire state variable data and/or the internal outputs, the data storage device (112) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the data storage device (112). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

Figure 9:
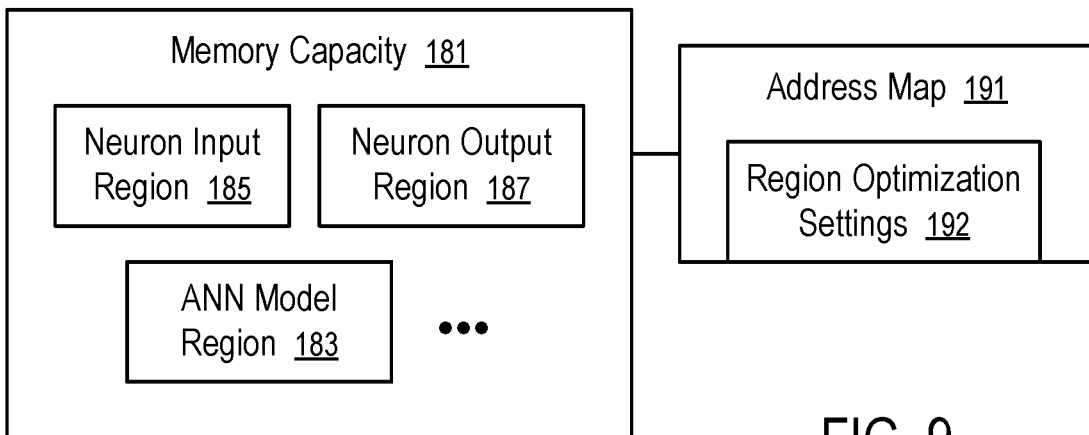
FIG. 9 shows a memory capacity configured to support neural network computations according to one embodiment.

FIG. 9 shows a memory capacity (181) configured to support neural network computations according to one embodiment. For example, the memory capacity (181) of the memory components (161 to 163) of the data storage device (112) of FIG. 7 can be configured according to FIG. 9 to support neural network computations.

The memory capacity (181) of FIG. 9 can be implemented using a set of memory components (e.g., 161 to 163) of the data storage device (112).

A set of regions (183, 185, 187, . . . ) can be created on the memory capacity (181) of the data storage device (112). Each of the region (e.g., 183, 185, or 187) corresponds to a named portion of the memory capacity (181). Logical addresses are defined within each region. An address map (191) is configured to map between the logical addresses defined in the regions (183, 185, 187, . . . ) to the physical addresses of memory units in the memory components (e.g., 161 to 163 illustrated in FIG. 7).

The address map (191) can include region optimization settings (192) for the regions (183, 185, and 187).

For example, an ANN model region (183) can be a memory/storage partition configured for the model data of the Artificial Neural Network (ANN) (125). The region optimization settings (192) optimizes the memory operations in the ANN model region (183) according to the data usage pattern of ANN models (e.g., mostly read, infrequent update centric).

For example, a neuron input region (185) can be a memory/storage partition configured for the external input data to the Artificial Neural Network (ANN) (125). The region optimization settings (192) optimizes the memory operations in the neuron input region (185) according to the data usage pattern of the external input data (e.g., for enhanced endurance supporting cyclic overwrite of continuous input data flow for sequential writes).

For example, a neuron output region (187) can be a memory/storage partition/configured for the external output data provided from the Artificial Neural Network (ANN) (125). The region optimization settings (192) optimizes the memory operations in the neuron output region (187) according to the data usage pattern of the external output data (e.g., improved endurance for periodically overwrite of data with random read/write access).

The data storage device (112) includes a buffer configured to store temporary/intermediate data of the Artificial Neural Network (ANN) (125), such as the internal inputs/outputs of the artificial neurons in the ANN (125).

Optionally, a swap region can be configured in the memory capacity (181) to extend the capacity of the buffer (152).

Optionally, the address map (191) includes a mapping between logic memory addresses received in the host interface (157) to access data of artificial neurons and the identities of the artificial neurons. Thus, a read or write command to access one type of data of an artificial neuron in one region can cause the controller 151 to access another type of data of the artificial neuron in another region.

For example, in response to a request to write external input data for a neuron into the memory capacity (181) of the data storage device (112), the address map (191) can be used to calculate the addresses of the model parameters of the neuron in the ANN model region (183) and read the model parameters into the buffer (152) to allow the neural network accelerator (159) to perform the computation of the output of the neuron. The output of the neuron can be saved in the buffer (152) as the internal input to other neurons (e.g., to reduce write amplification). Further, the identities of the other neurons connected to the neuron can also be retrieved from the ANN model region (183) into the buffer (152), which allows the neural network accelerator (159) and/or the processor to further process the propagation of the output in the ANN (125). The retrieval of the model data from the ANN model region (183) can be performed in parallel with the storing of the external input data into the neuron input region (185). Thus, the processors (133) of the computer system (131) of the vehicle (111) do not have to explicitly send in read commands for the retrieval of the model data from the ANN model region (183).

Similarly, in response to reading output data of a neuron, the address map (191) can be used to compute the addresses of the model parameters of the neuron stored in the ANN model region (183) and read the model parameters into the buffer (152) to allow the neural network accelerator (159) to apply internal inputs in the buffer (152) to the perform the computation of the output of the neuron. The computed output can be provided as a response to the reading of the output data for the neuron, without the data storage device (112) having to store the output data in the memory components (e.g., 161 to 163). Thus, the processors (133) and/or the neural network accelerator (159) can control the computations of the neuron via writing inputs to neurons and/or reading outputs from neurons.

In general, incoming external input data to the ANN (125) can be raw sensor data (121) generated directly by the sensors (e.g., 122) without processing by the processors (133) and/or the neural network accelerator (159). Alternatively, indirect sensor data (121) that has processed by the processors (133) for the ANN (125) from the signals from the sensors (122) can be provided as the external input data. The incoming external input data can be accepted in the host interface (157) and written in a cyclic way into the neuron input region (185), and automatically buffered in the buffer (152) for neural network accelerator (159) to generate neuron outputs using the model stored in the ANN model region (183). The outputs generated by the neural network accelerator (159) can be further buffered as internal inputs for further application of the model in the ANN model region (183). When the external outputs become available, the data storage device (112) can report the completion of the write requests with an indication of the availability of the external outputs. Optionally, the controller 151 and/or the neural network accelerator (159) can generate internal read commands to propagate signals in the ANN (125) in generating the external outputs. Alternatively, the host processors (133) can control the propagation of signals in the ANN (125) by selectively reading outputs of neurons; and the data storage device (112) can actively buffer data that may be needed in the buffer (152) to accelerate the ANN computation.

Figures 10, 11:
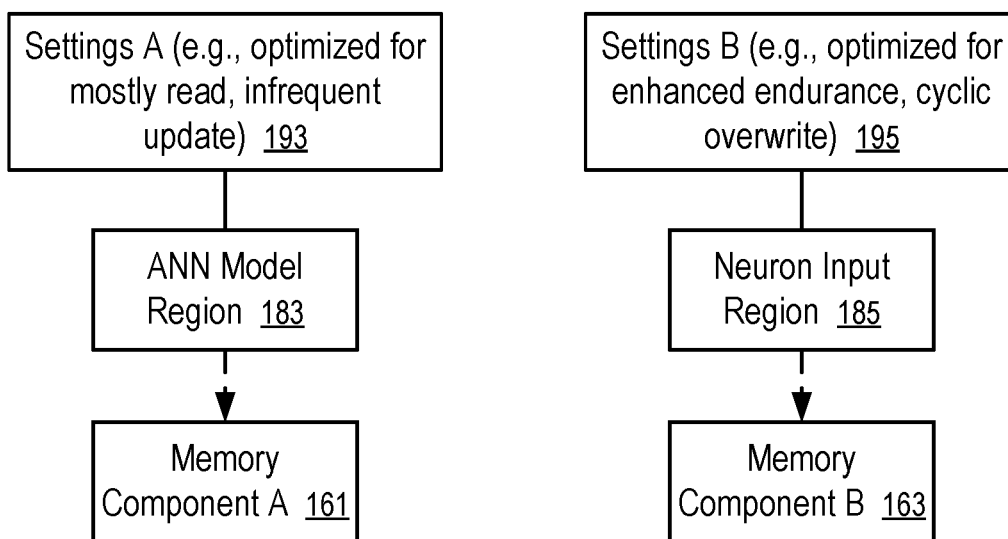
FIG. 10 illustrates the configuration of a memory region for an Artificial Neural Network (ANN) model according to one embodiment.
FIG. 11 illustrates the configuration of a memory region for the inputs to artificial neurons according to one embodiment.

FIG. 10 illustrates the configuration of a memory region (183) for an Artificial Neural Network (ANN) model according to one embodiment. For example, the configuration of FIG. 10 can be implemented in the data storage device (112) of FIG. 7 with a logical memory capacity (181) of FIG. 9. For example, the settings (193) of FIG. 10 can be part of the region optimization settings (192) of FIG. 9.

The configuration of FIG. 10 maps an ANN model region (183) to at least one memory component A (161). Preferably, the at least one memory component A (161) can be used by the controller (151) in parallel with memory components (e.g., 163) that hosts the other regions (e.g., 185 and 187) of ANN data. For example, the memory component A (161) can be in an integrated circuit package that is separate from the integrated circuit packages for the other regions (e.g., 185 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 10, the settings (193) are optimized to the usage pattern of mostly read and infrequent update.

FIG. 11 illustrates the configuration of a region (185) for the inputs to artificial neurons according to one embodiment. For example, the configuration of FIG. 11 can be implemented in the data storage device (112) illustrated in FIGS. 7 and/or 9. For example, the settings (195) of FIG. 11 can be part of the region optimization settings (192) of FIG. 9.

The configuration of FIG. 11 maps a neuron input region (185) to at least one memory component B (163). Preferably, the at least one memory component B (163) can be used by the controller (151) in parallel with memory components (e.g., 161) that hosts the other regions (e.g., 183 and 187) of ANN data. For example, the memory component B (163) can be in an integrated circuit package that is separate from the integrated circuit packages for the other regions (e.g., 183 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 11, the settings (195) are optimized to the usage pattern of enhanced endurance in cyclic sequential overwrite in recording a continuous stream of input data that is sampled at a fixed time interval.

Figure 12:
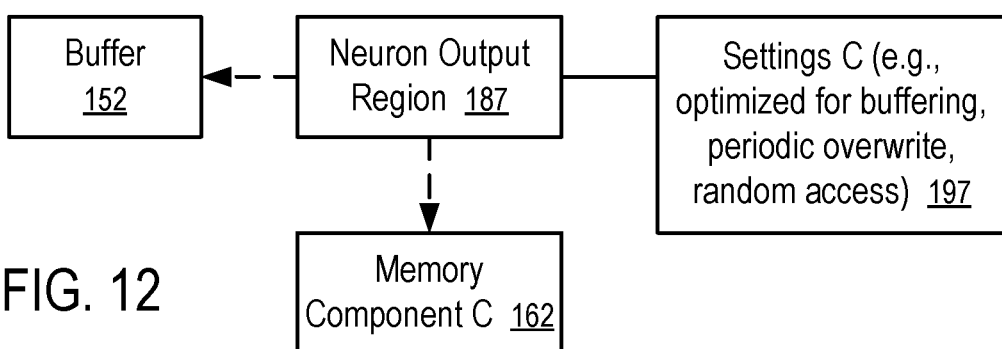
FIG. 12 illustrates the configuration of a memory region for the outputs from artificial neurons according to one embodiment.

FIG. 12 illustrates the configuration of a region (187) for the outputs from artificial neurons according to one embodiment. For example, the configuration of FIG. 10 can be implemented in the data storage device (112) illustrated in FIGS. 7 and/or 9. For example, the settings (197) of FIG. 10 can be part of the region optimization settings (192) of FIG. 9.

The configuration of FIG. 12 maps a neuron output region (187) to at least one memory component C (162). Preferably, the at least one memory component C (162) can be used by the controller (151) in parallel with memory components (e.g., 161 and 163) that hosts the other regions (e.g., 183 and 185) of ANN data. For example, the memory component C (162) can be in an integrated circuit package that is separate from the integrated circuit packages for the other regions (e.g., 183 and 185). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 12, the settings (197) are optimized to the usage pattern of buffered data for periodic overwrite with random access. For example, memory units are configured via the optimization settings (193 to 197) to update/overwrite in the neuron output region (187) at a frequency higher than in the ANN model region (183), but lower than in the neuron input region (185).

A communication protocol/interface can be configured to allow a data storage device to perform neural network acceleration on the fly with reduced data traffic to the host system.

For example, the host processor (e.g., 133) of a vehicle (111) can provide write commands to the data storage device (112) to store the model of an artificial neural network in a model partition (e.g., 183).

To use the ANN model in classifications and/or predictions, the host processor (e.g., 133) of a vehicle (111) can optionally stream input data for the ANN (125) into the neuron input partition (e.g., 185). The neural network accelerator (159) of the storage device (112) can automatically apply the images from the sensors (122) and, if there is any, the input data from the host processor (133) to the model stored in ANN model partition (e.g., 183) in accordance with the address map (191). The data storage device (112) makes the computed outputs available for propagation in the ANN (125). Preferably, the computed outputs are made available to the neural network accelerator (159) through the buffer (152) without the need to store the intermediate outputs into memory components (e.g., 161 to 163). Thus, the data communications between the host processor (e.g., 133) and the data storage device (112) for the transporting of outputs of neurons can be reduced. When the outputs have propagated to the output neurons in the ANN (125), the data storage device (112) can provide a response to a request from the host processor (e.g., 133). The response indicates that the external output from neurons in the ANN (125) is available. In response, the host processor (e.g., 133) of a vehicle (111) can optionally issue read commands to retrieve the external outputs for further processing.

Figure 13:
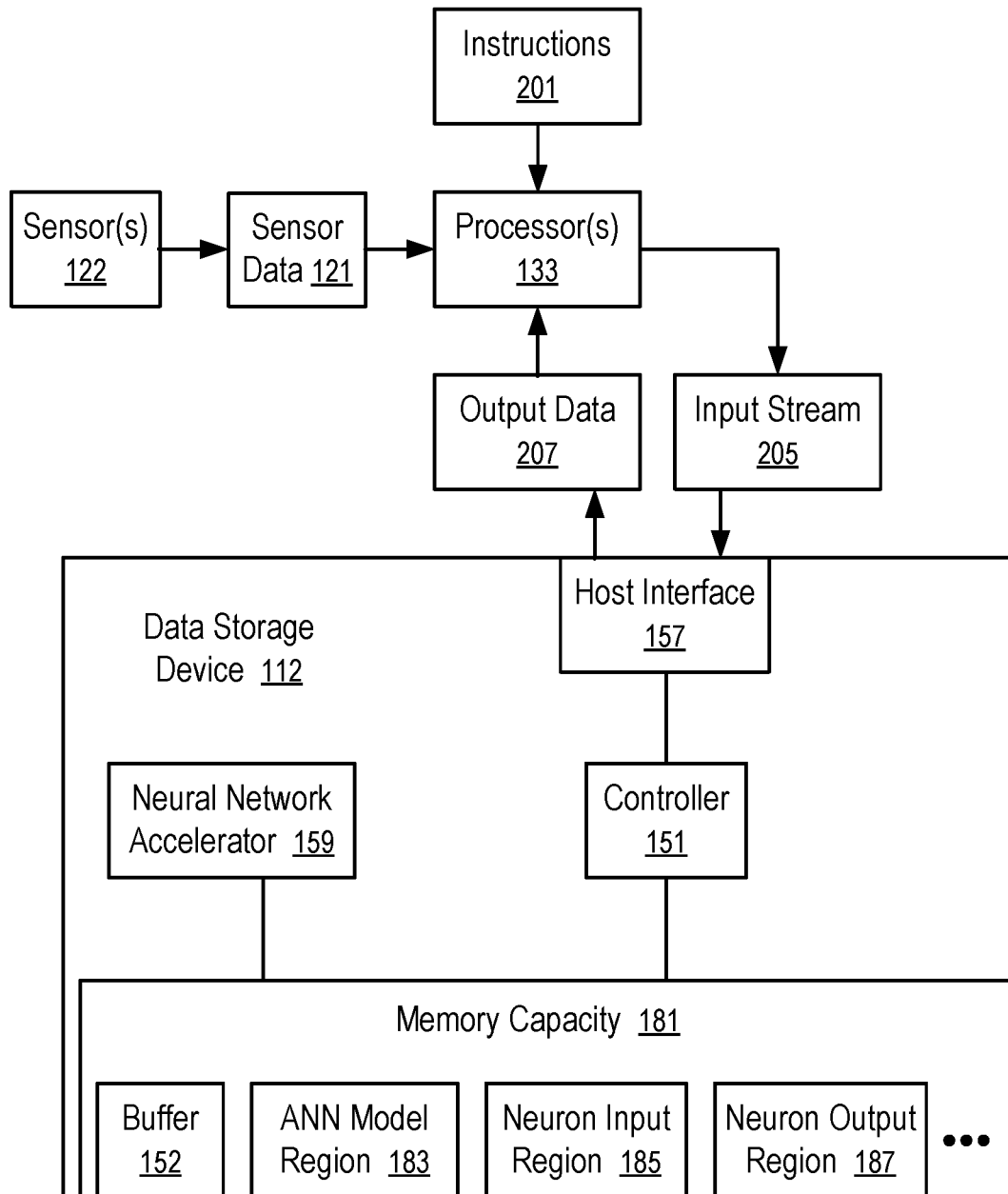
FIG. 13 shows communications between an autonomous vehicle and a data storage device according to one embodiment.

FIG. 13 shows communications between an autonomous vehicle (111) and a data storage device (112) according to one embodiment. For example, the communications as illustrated in FIG. 13 can be implemented in the vehicle (111) of FIG. 2 or 3, with a data storage device (112) illustrated in FIG. 1, or 7.

In FIG. 13, the processor(s) (133) of the host system can be configured with a simplified set of instructions (201) to perform neural network computation, since some of the computations involving the ANN (125) is performed by the neural network accelerator (159) within the data storage device (112). It is not necessary to transport the model data back to the processor(s) (133) during the use of the ANN (125) for predictions and/or classifications.

The sensors (122) can generate a continuous input stream (205) as part of sensor data (121) for the vehicle (111). The sensor data (121) in the input stream (205) can be generated at a fixed, predetermined time interval (e.g., during the operation of the vehicle (111)).

The input stream (205) is applied to input neurons in the ANN (125). Input neurons in the ANN (125) are configured to accept external inputs to the ANN (125); and output neurons are configured to provide external outputs from the ANN (125).

The processor(s) (133) can execute the instructions (201) to process the output data (207) from the data storage device (112) and some of the sensor data (121).

For example, the processor(s) (133) can write the sensor data (121) as part of the input stream (205) into the neuron input region (185) and read from the neuron output region (187) the output data (207) generated by the neural network accelerator (159) using the ANN data in the model region (183).

The data storage device (112) stores the input stream (205) into the neuron input region (185) in a cyclic way where the oldest input set corresponding to the oldest time instance of data sampling for data sets currently stored in the neuron input region (185) is erased to store the newest set of inputs.

For each input data set, the neural network accelerator (159) applies the model of the ANN (125) stored in the ANN model region (183). The neural network accelerator (159) (or the processor(s) (133)) can control the propagation of signals within the neural network. When the output neurons of the ANN (125) generate their outputs responsive to the input data set, the data storage device (112) can provide to the processor (133) an indication that the neuron outputs are ready for retrieval. The indication can be configured in a response to the request from the processor(s) (133) to write the input data set into the neuron input region (185). The processor(s) (133) can optionally retrieve the output data (207) (e.g., in accordance with conditions and/or criteria programmed in the instructions).

In some embodiments, a trigger parameter is configured in the data storage device (112). When an output parameter in the external output (217) meetings a requirement specified by the trigger parameter, the data storage device provides the response to the request from the processor(s) (133) to write the input data set into the neuron input region (185).

Figure 14:
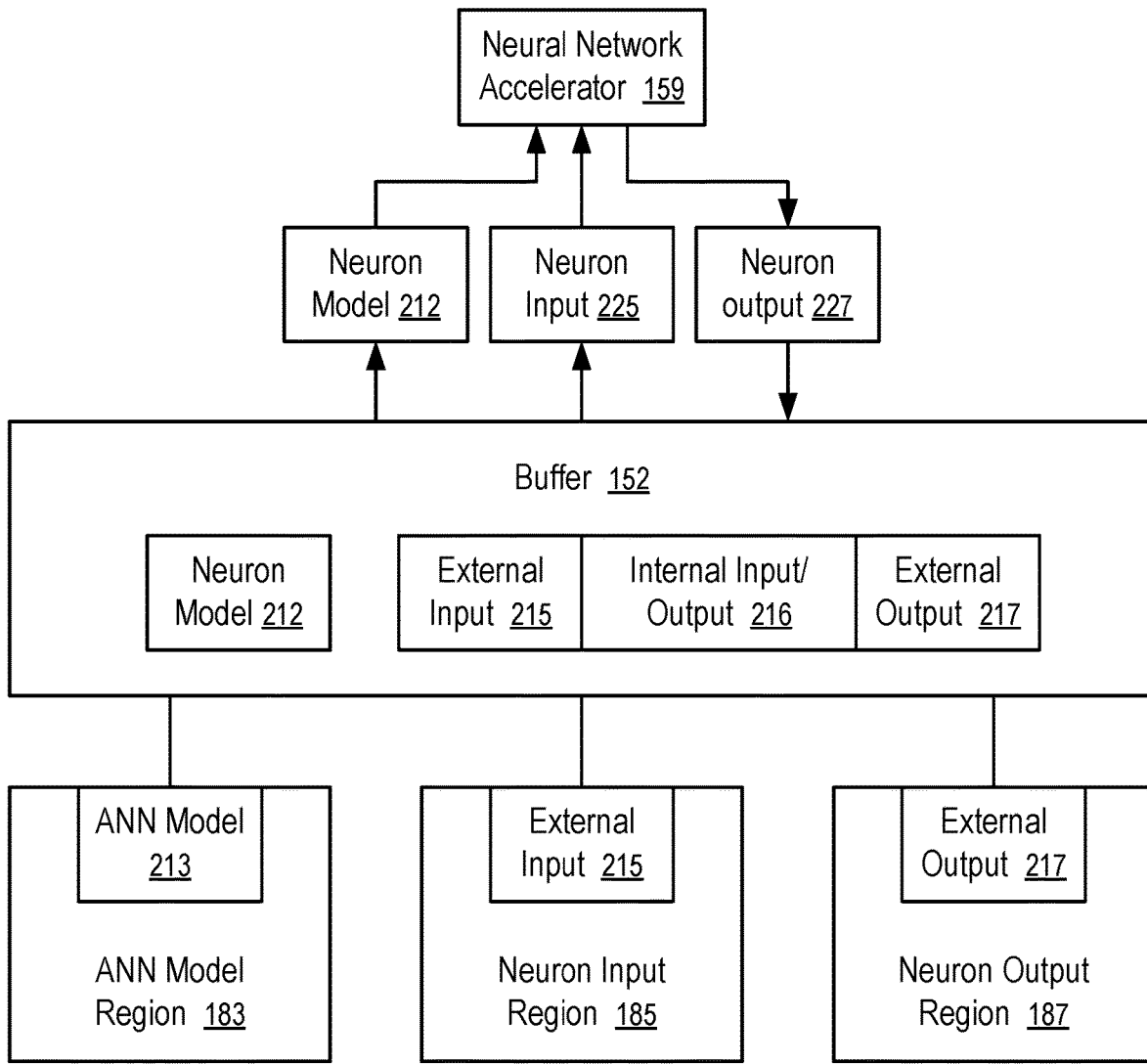
FIG. 14 shows communications within a data storage device according to one embodiment.

FIG. 14 shows communications within a data storage device (112) according to one embodiment. For example, the communications of FIG. 14 can be implemented a data storage device (112) illustrated in FIG. 1 or 7.

In FIG. 14, the model region (183) stores the model (213) of an ANN (125). In response to receiving a set of external input (215) for a time instance from the input stream (205) in the buffer (152), the data storage device (112) can write the external input (215) into the input region (185) in parallel with retrieving a neuron model (212) containing a portion of the ANN model (213) corresponding to the parameters of the input neurons and/or the identities of neurons connected to the input neurons. The buffer (152) allows the neural network accelerator (159) to combine the neuron model (212) and the external input (225) to generate the output (227) of the input neurons.

In general, the neuron output (227) can include a portion that is the internal output (216) for further propagation within the ANN (125) and/or a portion that is the external output (217) for the processor(s) (133).

The internal output (216) is stored in the buffer (152) as internal input (216) for further propagation in the ANN (125) in a way similar to the generation of neuron outputs (227) from the external input (215). For example, a portion of the internal input (216) can cause the controller (151) and/or the neural network accelerator (159) to retrieve corresponding neuron model (212) relevant to the internal input such that the internal input is applied in the neural network accelerator (159) to the corresponding neuron model (212) to generate their neuron outputs (227).

When the complete set of external output (217) is available in the buffer (152), the external output (217) can be stored into the output region (187).

Optionally, the storage device (112) does not store each set of external output (217) corresponding to a set of stored external input (215) sampled at a time instance. For example, the storage device (112) can be configured to store one set of external output (217) every time when a predetermined number of sets of external input (e.g., 215) has been counted. Alternatively, or in combination, the processor(s) (133) can determine whether or not to store the external output (217). For example, the storage device (112) can be configured to store the external output (217) in response to the processor(s) (133) retrieving the external output (217) for further processing. For example, the storage device (112) can be configured to store the external output (217) in response to a write command from the processor(s) (133) after the processing of the external output (217) in the processor(s) (133).

Figure 15:
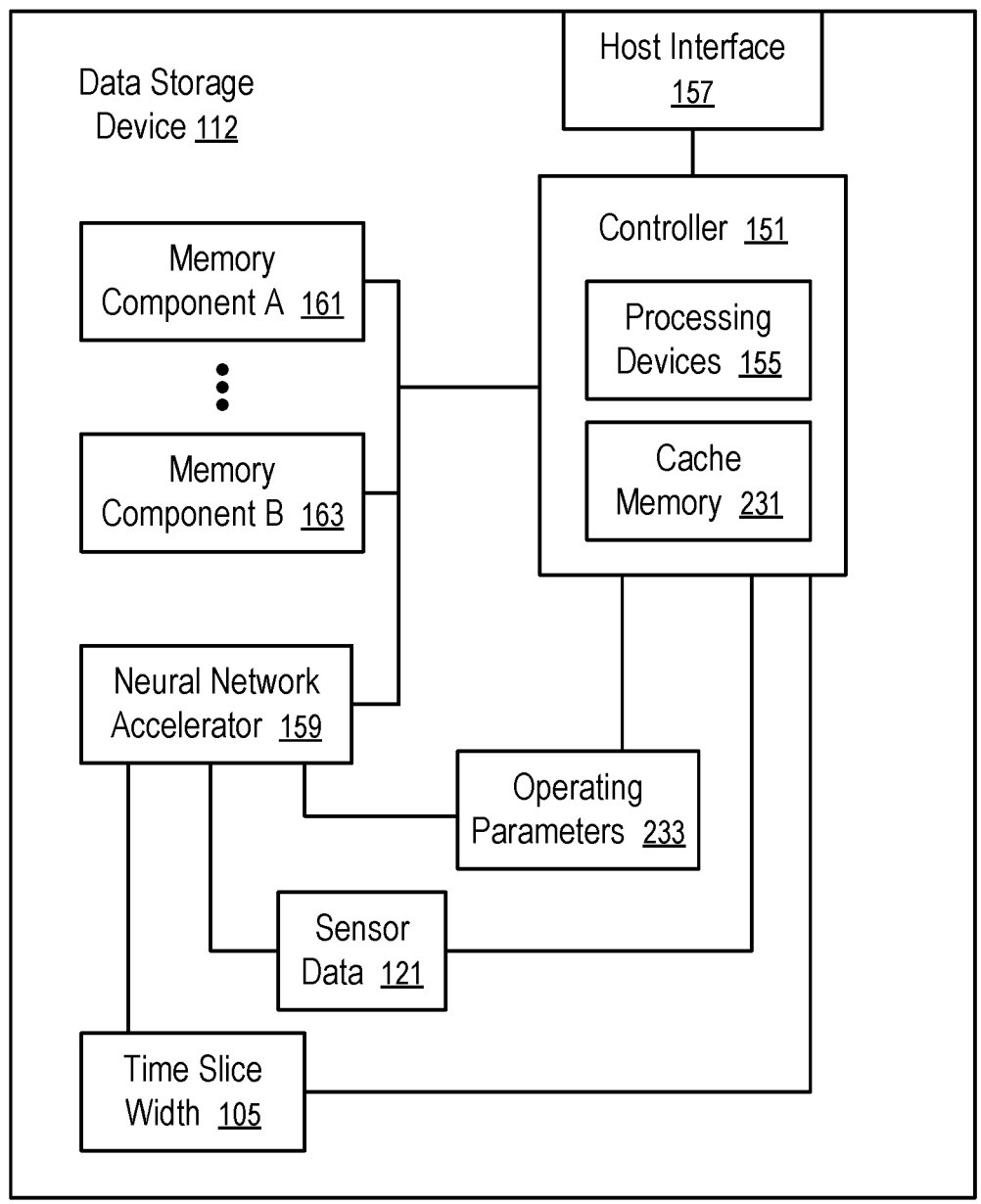
FIG. 15 shows a data storage device configured to process sensor data input according to one embodiment.

FIG. 15 shows a data storage device configured to process sensor data input according to one embodiment. For example, the data storage device of FIG. 15 can be implemented using the techniques of a data storage device (112) of FIG. 1 or 7 in a vehicle (111) illustrated in FIG. 2 or 3.

In FIG. 15, the data storage device (112) includes a neural network accelerator (159), and at least one ANN model (213) stored in the memory components (161 to 163).

The controller (151) is configured to use the neural network accelerator (159) to predict an optimized width (105) for selecting a segment (104) of the input stream (205) to isolate the impact of overwhelming stimuli (102) based on the operation parameters (233) and/or some of the sensor data (121) in the input stream (121).

For example, after the segment (104) containing overwhelming stimuli (102) is selected, the controller (151) can temporarily store the segment (104) into a memory component (161) (e.g., 161 or 163) for processing by a limited set of resources (e.g., a small portion of the processing devices (155) and/or a small portion of the neural network accelerator (159)), while the majority of the resources of the data storage device (112) is used to process the subsequent segment (106), before the processing of the selected segment (104) is complete.

The neural network accelerator (159) can be configured to retrieve the sensor data (121) from the memory components (161 to 163), the cache memory (231) and/or the buffer (152) to perform the computation in determining the inference results (e.g., 123) used in the operations of the vehicle (111), such as the operations of the ADAS (128). In a normal mode, the neural network accelerator (159) processes the sensor data (121) according to the time sequence. The slice of sensor data that is generated early is processed than the slice of sensor data that is generated later.

However, when the controller (151) detects the presence of overwhelming stimuli (102) that cause significant delay in real time processing of the sensor data (121) in the input stream (205), the neural network accelerator (159) uses the operating parameters (233) and/or the sensor data (121) in an artificial neural network (125) to predict an optimized width (105) for isolating the overwhelming stimuli (102). The optimized width (105) is used to select a segment (104) of the input stream (205) for processing by a small portion of the resources in the data storage device (112), while the subsequent segment (106) can be processed concurrently and/or in parallel by the majority of the resources in the data storage device (112).

In some implementations, after the processing of the overwhelming stimuli (102), the data storage device (112) identifies the width of time sliced portion of the overwhelming stimuli (102) and stores, as a portion of training dataset in the data storage device (112), the width of time sliced stimuli in association with the operating parameters (233) and/or the sensor data (121) at the time of the detection of the overwhelming stimuli (102). The data storage device (112) can accumulate over time a training dataset measured for the overwhelming stimuli (e.g., 102) experienced and processed by the data storage device (112). The training dataset can be downloaded at a maintenance service facility (127) during a service visit, or uploaded to the server (119) over the communication network (117). The server (119) can generate an updated artificial neural network (125) based on the training dataset obtained from the data storage device (112) and/or other similarly configured vehicle data recorders.

In general, an operating condition of the vehicle (111) can be identified via the operating parameters (233). The operating parameters (233) of the vehicle (111) can include the environmental temperature of the vehicle (111), a speed of the vehicle (111), a location of the vehicle (111), a roadway on which the vehicle (111) is traveling, inputs from some of the sensors (122) of the vehicle (111), inference results generated based on the inputs from some of the sensors (122), the status of vehicle controls (e.g., 141, 143, 145), the status of the components of the vehicle (111), such as the infotainment system (149) and/or the communication device (139) of the vehicle (111). The operating parameters (233) of the vehicle (111) can include the status and operations of the Advanced Driver Assistance System (ADAS) (128) and/or other applications/components running in the vehicle (111).

Examples of the operating parameters (233) can include inference results generated from the input data stream (205) of the data storage device (112) and/or provided in the output data (207) of the data storage device (112).

Figure 16:
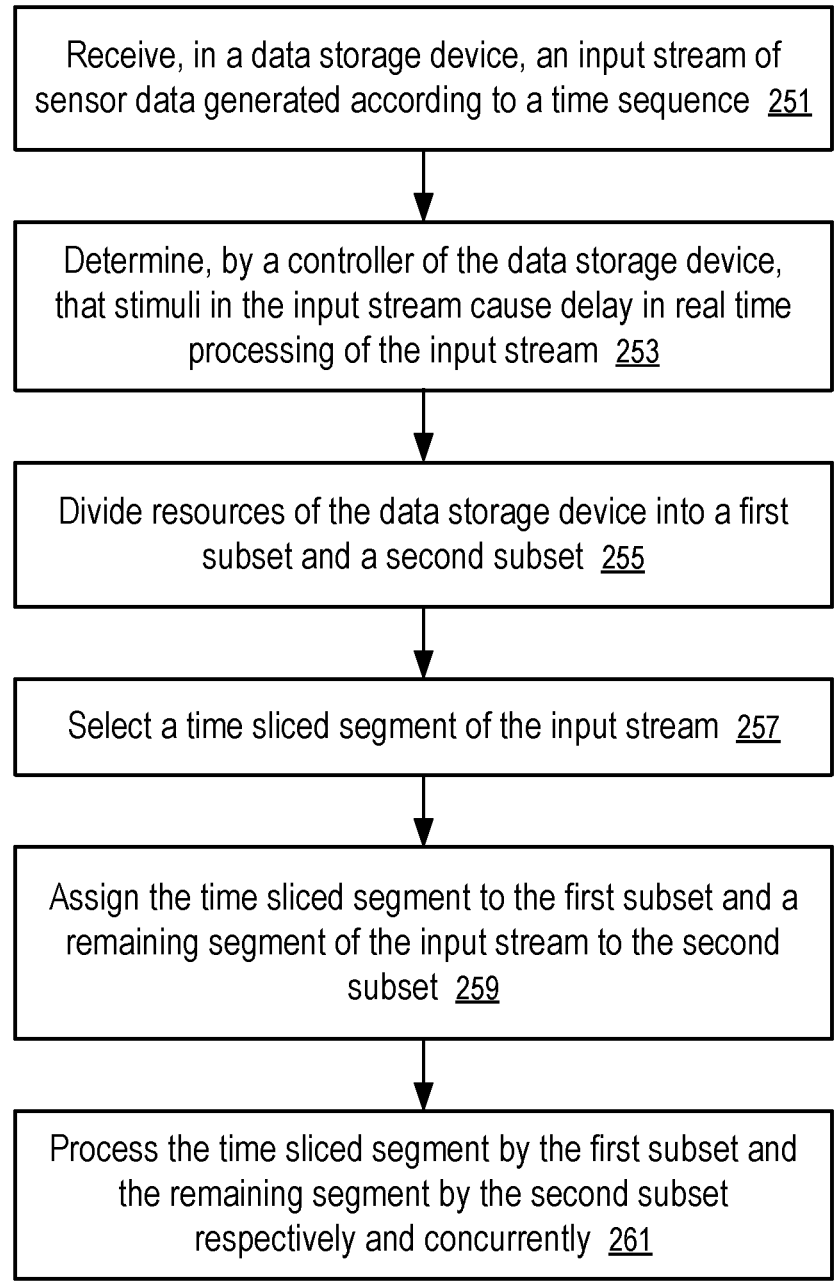
FIG. 16 shows a method to process sensor data input according to one embodiment.

FIG. 16 shows a method to process sensor data input according to one embodiment. For example, the method of FIG. 16 can be implemented in a data storage device (112) of FIG. 1, 7, 13 or 15 in connection with a computer system (131) or ADAS (128) of FIG. 3 in a vehicle (111) of FIG. 2 or 3.

At block 251, a data storage device (112) receives an input stream (205) of sensor data (121) generated according to a time sequence.

At block 253, a controller (151) of the data storage device (112) determines that stimuli (102) in the input stream (205) cause delay in real time processing of the input stream (205).

At block 255, resources of the data storage device (112) is divided into a first subset and a second subset.

For example, the first subset can include a portion of processor cores of the controller (151) of the data storage device (112), a portion of memory components (e.g., 107, . . . , 108) of the data storage device (112), a portion of the processing units of an inference engine (109) of the data storage device (112), or a portion of a buffer (152) of the data storage device (112), or any combination thereof; and the second subset includes resources of the data storage device that are not in the first subset.

At block 257, a time slice selector (101) selects a time sliced segment (104) of the input stream (205).

At block 259, the time sliced segment (104) is assigned to the first subset and a remaining segment of the input stream assigned to the second subset.

At block 261, the first subset processes the time sliced segment (104), while the second subset processes the remaining segment (106) concurrently.

For example, the time sliced segment (104) can be selected (257) through computing a first width (105) of the time sliced segment (104) using an artificial neural network (ANN) (125). Based on the processing (261) of the time sliced segment (104) by the first subset and the remaining segment (106) by the second subset respectively and concurrently, an abnormal segment of stimuli in the combination of the time sliced segment (104) and the remaining segment (106) can be identified with improved precision. Thus, a second width of the abnormal segment can be determined and used to generate training data. The training data contains the second width and operating parameters (233) to train the artificial neural network (ANN) (125) to reduce a difference between the second width and a width predicted using the operating parameters (233) in the artificial neural network (ANN) (125).

For example, a vehicle (111) can have one or more sensors (122) configured to generate an input stream (205) of sensor data (121) according to a time sequence during operation of the vehicle (111). An Advanced Driver Assistance System (ADAS) (128) of the vehicle (111) is configured to operate the vehicle (111) based on sensor data (121). A black box data recorder configured on the vehicle (111) can include a data storage device (112) configured to store a portion of the sensor data (121) generated by the one or more sensors (122). The data storage device (112) can have a first subset of resources and a second subset of resources such that when the first subset of resources is overwhelmed by abnormal stimuli (e.g., 102) generated in a short period of time, the second subset of resources can continue processing the normal stimuli (106) in real time. For example, the normal stimuli (106) can be processed in real time to provide inference results (e.g., 123) to the ADAS (128) of the vehicle (111) with delay below a threshold such that the ADAS (128) can use the inference results from the data storage device (112) to safely control the operation of the vehicle (111).

For example, in response to a determination that stimuli (102) in the input stream (205) causes delay in real time processing of the input stream (205) (e.g., a delay above a predetermined threshold), a time slice selector (101) of the data storage device (112) can select a time sliced segment (105) of the input stream (205) using an artificial neural network (ANN) (125). Since the overwhelming stimuli (102) in the selected segment (104) is routed to the first subset for processing, the second subset can be used to process the normal stimuli (103) without delay.

If an additional portion of overwhelming stimuli (102) is found in the remaining segment (106) to cause significant delay, a further time sliced segment can be selected for processing by the first subset of resources. Thus, significant delay is limited to the processing in the first subset of resources, the delay in the processing in the second subset can be kept below a threshold.

When the time sliced segment (104) selected according to the width (105) for processing by the first subset includes a portion of normal stimuli, the processing of the portion of normal stimuli included in the time sliced segment (104) is delayed. Such delay can be reduced/optimized by training the artificial neural network (ANN) (125) to improve its precision in predicting the width (105) for selecting the time sliced segment (105).

Similarly, when the remaining segment (106) generated as a result of selecting the time sliced segment (104) according to the width (105) includes a residual portion of abnormal stimuli, the processing of the portion of normal stimuli (103) in the remaining segment (106) is delayed. Such delay can be reduced/optimized by training the artificial neural network (ANN) (125) to improve its precision in predicting the width (105) for selecting the time sliced segment (105).

Optionally, the inference engine (109) of the data storage device (112) is configured to train the artificial neural network (ANN) using the training data obtained from processing the input stream (205). Alternatively, the training data can be downloaded to a maintenance service facility (127) and/or a server (119) to train the artificial neural network (ANN) (125) at a location separate from the vehicle (111).

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system (e.g., 131 and/or 119) causes the system to perform various methods discussed above (e.g., the method of FIG. 16). The executable software and data may be stored in various places including for example ROM, volatile RAM, non-volatile memory and/or cache discussed above (e.g., 112, 135, and/or 152). Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data storage device, comprising:
an input buffer; one or more memory components;
a controller; and an inference engine; wherein the data storage device is configured to receive an input stream of sensor data generated according to a time sequence; wherein the controller is configured to determine that stimuli in the input stream overflows the input buffer causing delay in real time processing of the input stream and in response, select a time sliced segment of the input stream, assign the time sliced segment to a first subset of resources of the data storage device, and assign a remaining segment of the input stream to a second subset of the resources of the data storage device; and wherein the first subset of resources of the data storage device and the second subset of resources of the data storage device are configured to process the time sliced segment and the remaining segment respectively and concurrently.

2. The data storage device of claim 1, further includes a time slice selector configured to determine a first width used to select the time sliced segment.

3. The data storage device of claim 2, wherein the time slice selector is configured to determine the first width using an artificial neural network (ANN).

4. The data storage device of claim 3, wherein the first width is determined by the artificial neural network (ANN) using operating parameters of a vehicle in which the data storage is configured; and the sensor data is generated by sensors configured on the vehicle.

5. The data storage device of claim 4, wherein the artificial neural network (ANN) further uses at least a portion of the sensor data in the input stream to calculate the first width.

6. The data storage device of claim 4, wherein the controller includes multiple processing cores; and different subsets of the multiple processing cores are configured in the first subset of resources and the second subset of resources respectively.

7. The data storage device of claim 4, wherein the one or more memory components include multiple memory components capable of being operated upon independently from each other concurrently; and different subsets of the multiple memory components are configured in the first subset of resources and the second subset of resources respectively.

8. The data storage device of claim 4, wherein the inference engine includes multiple units capable of operating independently from each other concurrently; and different subsets of the multiple units of the inference engine are configured in the first subset of resources and the second subset of resources respectively.

9. The data storage device of claim 4, wherein during processing of the time sliced segment and the remaining segment, the controller determines a second width of a segment for processing by the first subset of resources of the data storage device; and the controller is configured to store the second width as part of a training dataset for the artificial neural network (ANN).

10. The data storage device of claim 9, wherein the training dataset further includes operating parameters of the vehicle or sensor data of the vehicle used to determine the first width.

11. The data storage device of claim 9, wherein the inference engine is further configured to train the artificial neural network (ANN) using the training dataset to minimize a difference between a width predicted using the artificial neural network (ANN) and the second width.

12. The data storage device of claim 9, wherein the inference engine includes one or more neural network accelerators configured to perform matrix arithmetic computations more efficiently than the controller.

13. A method, comprising:
receiving, in an input buffer of a data storage device, an input stream of sensor data generated according to a time sequence; determining, by a controller of the data storage device, that stimuli in the input stream overflows the input buffer causing delay in real time processing of the input stream; dividing resources of the data storage device into a first subset and a second subset; selecting a time sliced segment of the input stream; assigning the time sliced segment to the first subset and a remaining segment of the input stream to the second subset; and processing the time sliced segment by the first subset and the remaining segment by the second subset respectively and concurrently.

14. The method of claim 13, wherein the first subset includes a portion of processor cores of the controller of the data storage device, a portion of memory components of the data storage device, or a portion of a buffer of the data storage device, or any combination thereof; and the second subset includes resources of the data storage device not in the first subset.

15. The method of claim 14, wherein the selecting of the time sliced segment includes computing a first width of the time sliced segment using an artificial neural network (ANN) and selecting the time sliced segment using the first width.

16. The method of claim 15, further comprising:
identifying an abnormal segment of stimuli in the time sliced segment and the remaining segment, based on the processing of the time sliced segment by the first subset and the remaining segment by the second subset respectively and concurrently;
determining a second width of the abnormal segment; and
generating training data containing the second width to train the artificial neural network (ANN).

17. A vehicle, comprising:
one or more sensors configured to generate an input stream of sensor data according to a time sequence during operation of the vehicle; an Advanced Driver Assistance System (ADAS) configured to operate the vehicle based on sensor data; and a data storage device having an input buffer and configured to store a portion of the sensor data generated by the one or more sensors, the data storage device having a first subset of resources and a second subset of resources; wherein the data storage device is configured to determine that stimuli in the input stream overflows the input buffer causing delay in real time processing of the input stream and in response, select a time sliced segment of the input stream; and wherein the first subset of resources and the second subset of resources are configured to process the time sliced segment and a remaining segment respectively and in parallel.

18. The vehicle of claim 17, wherein the data storage device includes an artificial neural network (ANN) configured to compute a first width that is used to select the time sliced segment for the first subset of resources.

19. The vehicle of claim 18, wherein the data storage device is further configured to:
determine, based on a result of the first subset of resources and the second subset of resources processing the time sliced segment and the remaining segment respectively and in parallel, a second width to optimize selection of a segment for processing by the first subset of resources; and
generate data containing the second width to train the artificial neural network (ANN).

20. The vehicle of claim 19, wherein the data storage device is further configured to train the artificial neural network (ANN) using the data containing the second width.

* * * * *